United States Patent Office 3,796,787
Patented Mar. 12, 1974

3,796,787
METAL EXTRACTION PROCESS
Raymond C. Burrows, Mississauga, Ontario, Canada, assignor to Ashland Oil, Inc., Ashland, Ky.
No Drawing. Filed Mar. 8, 1972, Ser. No. 232,911
Int. Cl. C01g 3/00, 9/00, 53/00
U.S. Cl. 423—24
10 Claims

ABSTRACT OF THE DISCLOSURE

Substituted diphenyl sulfides serving as effective ionic extractants for the recovery of metal values from dilute aqueous solutions thereof.

---

This invention relates to a process for the recovery of dissolved metal values from aqueous solutions. More particularly, it relates to an organic solvent extraction process for recovering metals from aqueous solutions in which the metals are present as dissolved divalent metal salts.

It is well known to extract metal values from metal bearing materials by hydrometallurgical methods involving leaching with acidic, basic or metal salt solutions. Such methods are commonly applied to a variety of metal bearing materials such as ores, ore concentrates, scrap materials, mattes, metallurgical residues and the like to produce leach solutions of widely varying composition from which the metal values are subsequently recovered. Many processes are known and in use for recovering the dissolved metal values from such solutions. Most of these involve chemical precipitation of the various metal values either selectively or as bulk precipitates followed by further treatment of the solution and precipitates to separately recover each of the desired metals as a relatively pure product. Such processes are often technically complicated and the resultant separations not always as good as might be desired. Moreover, most of them also require large quantities of chemical reagents, many of which are non-regenrative. In addition to the effect of costs, this often creates disposal problem which can be particularly serious in view of the increasingly stringent regulations concerning industrial pollution.

More recently, it has been proposed to recover metals from aqueous solutions by means of liquid organic solvent extraction processes. In these processes, a water-immiscible organic solvent, such as kerosene or naphtha, containing an organic extractant reagent is contacted with the metal bearing aqueous solution and the two phases are then allowed to separate. After separation from the metal-depleted aqueous solution (referred to in the art as the "raffinate"), the metal-loaded organic phase is treated in a stripping operation in which the metal values are transferred from the organic phase to an aqueous solution for subsequent treatment and the stripped organic solvent is recycled to treat fresh aqueous feed solution.

Processes of this nature appear, in theory at least, to offer a number of advantages over the more conventional inorganic chemical procedures for recovery of metals from solutions, particularly in the treatment of very dilute metal bearing solutions. However, the liquid organic extraction processes heretofore proposed suffer from a number of disadvantages which have discouraged their widescale commercial adoption. These include relatively high reagent cost, lack of selectivity for specific metals and/or inability to function efficiently in ammoniacal solutions.

The present invention provides a liquid-liquid organic solvent extraction process which utilizes a readily available and relatively inexpensive organic extractant reagent and which premits simple and efficient extraction of divalent metal ions from aqueous solutions and particularly from ammoniacal solutions. The invention is based on the discovery that certain bisphenol sulphide compounds function to form complexes with such metals which are preferentially extracted from an aqueous phase into a liquid organic phase. According to the process of the invention, the aqueous metal containing solution is contacted with an inert organic diluent phase containing dissolved bisphenol sulphide compound. During contact of the organic and aqueous phases, the organic phase becomes loaded with metal values. The two phases are then separated and the organic phase containing the extracted metal values is treated to remove the metal values.

The solvent extraction reagent used according to the invention is a bisphenol sulphide of the type:

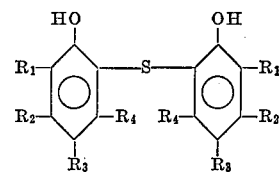

wherein $R_1$, $R_2$, $R_3$ and $R_4$ are hydrogen, alkyl, aryl, alkylaryl or other substituents, such as halogen or nitro, in such combinations that the compound is soluble in the organic diluent but essentially insoluble in water.

All of the bisphenol sulphide compounds within the general group do not, of course, exhibit precisely the same metal extracting characteristics under the same conditions of feed solution composition. The extent to which metals are extracted by any specific compound of the group is particularly sensitive to the composition of $R_1$. Generally as the bulk of $R_1$ increases, the extent of extraction of any one metal by the extractant compound under otherwise constant conditions decreases. For example, an extractant compound in which $R_1$ is hydrogen will extract more nickel from a given solution, e.g., a nickel ammine sulphate solution, than will an extractant in which $R_1$ is methyl or isopropyl with all other conditions being the same. Where $R_2$, $R_3$ and $R_4$ are hydrocarbon groups, the composition and bulk of these radicals has relatively little effect on the metal extracting ability of the extractant compound. However, these radicals do affect the solubility of the extractant compound in the aqueous solution and in the diluent as well as the solubility of the extractant-metal complex in the diluent phase. Preferably $R_2$, $R_3$ and $R_4$ are selected such that the extractant compound has low solubility in the aqueous phase, and, since the loading capacity of the extractant is inversely related to its molecular weight, to provide a compound with a low molecular weight.

Specific bisphenol sulphides compounds which can be advantageously used according to this invention include:

2,2'-thiobis (4-methyl-6-tertiary butylphenol);
2,2'-thiobis (4-nonylphenol);
2,2'-thiobis (4-nonyl-6-methylphenol);
2,2'-thiobis (4-nonyl-6-ethylphenol);
2,2'-thiobis (4-nonyl-6-isopropylphenol);
2,2'-thiobis (4-nonyl-6-tertiary butylphenol);
2,2'-thiobis (4-methylphenol);
2,2'-thiobis (4-tertiary butylphenol);
2,2'-thiobis (4-octylphenol);
2,2'-thiobis (4-dodecylphenol);
2,2'-thiobis (4-tridecylphenol);
2,2'-thiobis (4-laurylphenol);
2,2'-thiobis [4-(1-methylbenzyl) phenol];
2,2'-thiobis [4,6-di(tertiary butyl) phenol];
2,2'-thiobis (α-naphthol);
1,1'-thiobis (α-naphthol).

The reagents employed in the process of the invention may be prepared by an conventional or unconventional methods. One method of preparation involves synthesis by the reaction of sulphur dichloride with two equivalents of the corresponding phenol

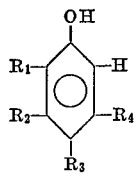

in an inert solvent which can later be removed. In some cases, the reaction can be carried out in the solvent which is used as the organic diluent for the extractant reagent. Where the ortho-unsubstituted phenol is available at low cost, as is often the case, the bisphenol sulphide product is specially economical for use as a solvent extraction reagent in accordance with the invention because $SCl_2$ is inexpensive and the organic reaction forming the bisphenol sulphide normally proceeds in very high yields.

The bisphenol sulphide is employed in solution in an inert organic solvent or diluent which is substantially immiscible with the aqueous solution containing the dissolved metal values. In general, any organic solvents which are non-reactive and substantially immiscible with the aqueous solution are suitable including aliphatic or aromatic hydrocarbons, halogenated hydrocarbons, petroleum derivatives, ethers and mixtures thereof. Inexpensive aromatic or aliphatic hydrocarbons, such as kerosene or naphtha, are preferred as diluents but specific compounds such as toluene, carbon tetrachloride, benzene, chloroform, methylene chloride and 2-ethyl hexanol may also be used.

Preferably a modifying agent such as nonylphenol, isodecanol, or tributylphosphate is added to the organic diluent phase in an amount up to about 25%, preferably about 10%, for the purpose of aiding phase disengagement and also for accelerating the rate of metals transfer between phases.

The process of the invention is independent of the source or origin of the metal containing aqueous solution from which metal values are to be extracted. Many processes are known and in commercial use which produce solutions containing dissolved divalent metal ions which are extractable by the process of the invention. Any such solutions, after separation of undissolved residue, purification treatment and pH adjustment, if necessary or desired, can be treated by the present process.

The process is conducted by contacting the metal bearing aqueous feed solution with an organic phase comprised of bisphenol sulphide extraction compound dissolved in an inert organic diluent. The relative proportions of extractant reagent to diluent are not critical. Generally from about 5 to about 25% by wt. extractant in diluent is employed. Similarly, the relative proportions of organic phase to aqueous phase are not critical; for most cases a volume ratio of organic to aqueous feed $(V_o/V_a)$ within the range of about 10:1 to 1:10, preferably about 1:1, is employed. Any conventional procedure and apparatus may be used for effecting the liquid-liquid contact. The basic requirement is that there by sufficient agitation to ensure contact between phases. The extraction is conducted at any convenient temperature and pressure so long as the various solvent media remain in the liquid phase. The utilization of ambient temperature and pressure is preferred as a matter of convenience.

Separation of the aqueous and organic phase by conventional methods yields an organic phase containing at least a portion of the extractable metal values originally present in the aqueous feed and an aqueous raffinate. Loading capacity of the organic phase depends, in the main, on the concentration of extractant reagent in the organic phase, on the nature of the extractant reagent, especially its molecular weight, and on the composition of the aqueous phase. Loadings of up to about 20 g.p.l. of metal for concentrated solutions of extractant in diluent are posible but, normally to avoid undesirable viscosity buildup, loadings of 10 g.p.l. or less are preferred The metal-loaded organic phase preferably is next treated to strip the metal values. Preferably this is done by contacting the organic phase with an aqueous sulphuric acid solution, although other acid solutions or concentrated ammoniacal ammonium sulphate solutions may also be used in some cases. The stripped organic is recycled to treat fresh aqueous feed, or raffinate from a previous extraction operation. The stripping solution preferably is passed to any suitable further treatment for recovery of the extracted metal values in substantially pure form.

As indicated hereinabove, the process of the invention is generally effective to extract from aqueous solutions dissolved values of any metal which is in solution as a divalent salt. However, like the prior art cation exchange solvent extraction reagents, the reagents of the invention require a certain minimum pH level in the aqueous phase for extraction of each metal. Although the value of this minimum pH is dependent most importantly on the nature of the specific extractant reagent and the specific metal, it also is influenced by the concentration of the reagent in the organic phase as well as by the organic diluent and modifiers. Also, most polyvalent metal cations precipitate as their hydroxides as the pH of an acidic aqueous solution containing these metals is increased. While the process of this invention is generally applicable to the extraction of any divalent metal cation, it is most useful for those divalent metal cations which can be held in aqueous solution as complex ammines so that the minimum pH for extraction can be readily attained without precipitation of the metal hydroxides. Such metals are cobalt, nickel, copper, cadmium and zinc. Nonetheless, the process of this invention also applies to divalent metals that do not form stable complex ammines, such as calcium, that form water-soluble hydroxides and, such as ferrous iron, that although giving water-insoluble hydroxides are effectively extracted by the above reagents near the pH of hydroxide precipitation. In the following discussion of the practice of the invention, it should also be noted that although the process is described as applied to extraction of certain specific metals, there are many other ions such as sodium, potassium and ammonium ions which may be present in the solution without adversely affecting the desired extraction. Also, of course, two or more extractable, divalent metals may be present together in solution.

NICKEL EXTRACTION

Nickel is extracted from slightly acidic solutions by some of the extractant reagents of the invention, particularly those in which $R_1$ is hydrogen, and is extracted from basic solutions by all of the reagents, although all reagents within the general group will not necessarily be effective within the same pH range. For example, 2,2'-thiobis (4-nonylphenol) extracts nickel from ammonium sulphate solutions at any pH above about 6, whereas 2,2'-thiobis (4-nonyl-6-methylphenol) extracts nickel efficiently only at pH values above 10.6 under otherwise comparable conditions of solution composition.

Nickel extraction from ammonium sulphate and/or carbonate solutions is sensitive to ammonia, ammonium sulphate and ammonium carbonate concentration. In general, with increasing ammonia concentration nickel extractions first increase then reach a peak and rapidly fall off. The ammonia concentration required for the maximum degree of extractive efficiency varies depending on the extractant reagent used and the solution composition.

Extraction of nickel decreases with increasing ammonia sulphate or carbonate concentrations although the adverse affect of carbonate concentration on nickel extraction is less pronounced than sulphate. For optimum nickel extraction, ammonium sulphate concentrations in the order of 50 grams per liter or less are preferred although nickel can be extracted with ammonium sulphate concentrations as high as 500 g.p.l. provided the ammonia concentration is properly adjusted. For ammonium carbonate solutions $CO_2$ concentration should be below 50 g.p.l. and preferably below 20 g.p.l.

Optimum concentrations of ammonia and ammonium salt for any specific ammoniacal solution and extractant reagent can readily be determined by those skilled in the art by means of a few simple, experimental trials.

Extraction of nickel from the feed solution under optimum conditions of ammonia and ammonium sulphate or ammonium carbonate concentration is very rapid. In most cases, equilibrium is obtained with equal volumes of aqueous and organic phases within a few minutes.

Nickel is readily stripped from the loaded organic extractant phase either with concentrated ammonia-ammonium sulphate solution, e.g. 50 g.p.l. $NH_3$ and 450 g.p.l. $(NH_4)_2SO_4$ or with acid solution. For example, rapid and complete stripping of nickel is obtained with 50 g.p.l. sulphuric acid solution.

The extraction of nickel from aqueous solutions is further explained and illustrated by the following specific examples.

In all examples, unless otherwise indicated, the inert diluent was prepared by dissolving 10 parts by weight isodecyl alcohol in 100 parts of kerosene. The organic solvent phase was then made up by dissolving 10 weight percent of the bisphenol sulphide compound in this diluent. For each test, equal volumes of the aqueous and organic phases were measured into containers and agitated on a laboratory mixer for 15 minutes. After the phases separated, portions of each were removed for analysis, the amount of metal extracted from the feed solutions or stripped from the loaded organic was determined and reported as a percentage of that available for extraction or stripping, as the case may be.

EXAMPLE 1

The organic extractant compound was bis(4-nonylphenol) sulphide prepared as follows: 1 equivalent of distilled sulphur dichloride in hexane was added to a stirred solution of 2 equivalents of nonylphenol in hexane over 1 hour at room temperature. The mixture was then refluxed gently for about 2 hours, cooled, washed with 5% $NaHCO_3$ and with water and dried over $MgSO_4$. The solvent was stripped off to leave a soft brown semisolid nonylphenoyl sulphide in about 95% yield.

The metal bearing aqueous feed solution was an ammoniacal nickel ammonium sulphate solution containing 2 g.p.l. of nickel and 450 g.p.l. $(NH_4)_2SO_4$. A series of extractions was carried out on fresh samples of this solution with ammonia content being increased for each successive test. The results are shown in Table I.

TABLE I

| $NH_3$ concentration (g.p.l.) | 1 | 2 | 3 | 5 | 10 | 20 | 50 |
|---|---|---|---|---|---|---|---|
| Nickel extraction (percent) | 56 | 80 | 83 | 83 | 50 | 18 | 7 |

EXAMPLE 2

The extractant compound was the same as in Example 1. The feed solution contained 5.0 grams per liter of nickel and 6.0 grams per liter of ammonia. Ammonium sulphate concentration was increased for each successive test. The results are shown in Table II.

TABLE II

| $(NH_4)_2SO_4$ (g.p.l.) | 50 | 100 | 200 | 300 | 400 |
|---|---|---|---|---|---|
| Nickel extraction (percent) | 82 | 72 | 57 | 52 | 48 |

EXAMPLE 3

This example illustrates the rate of stripping of nickel from loaded organic. The extractant compound was the same as in Example 1. The loaded organic contained 3 grams per liter of nickel and the volume ratio of stripping solution to loaded organic was 1:1. Rate of stripping of nickel with 50 g.p.l. $H_2SO_4$ solution is shown in Table III.

TABLE III

| Contact time (minutes) | 1 | 3 | 5 | 10 | 15 |
|---|---|---|---|---|---|
| Nickel stripped (percent) | 67 | 98 | 100 | 100 | 100 |

EXAMPLE 4

The extractant reagent was the same as in Example 1. The feed ammoniacal nickel ammonium carbonate solution containing 9.5 g.p.l. Ni and 25 g.p.l. $CO_2$. The effect of increasing $NH_3$ concentration in the aqueous feed solution on nickel extraction is shown in Table IV.

TABLE IV

| $NH_3$ concentration (g.p.l.) | 10 | 20 | 40 | 60 | 75 |
|---|---|---|---|---|---|
| Nickel extraction (percent) | 73.8 | 71.5 | 63.2 | 58.0 | 50.6 |

EXAMPLE 5

In this example, the extractant was 2,2'-thiobis (4-nonyl-6-methylphenol) prepared by the same procedure as described in Example 1 except that 4-nonyl-6-methylphenol was substituted for the nonylphenol. Ten percent of the extractant was disolved in diluent consisting of kerosene with 10 wt. percent nonylphenol modifier added.

The feed solution contained 1 g.p.l. nickel and 132 g.p.l. $(NH_4)_2SO_4$. Extractions were carried out on a number of samples at successively increasing pH levels. pH was adjusted by addition of NaOH. Table V shows the extraction of nickel at various pH values.

TABLE V

| pH | 8.6 | 9.8 | 10.5 | 10.9 | 11.4 |
|---|---|---|---|---|---|
| Nickel extraction (percent) | 16.2 | 24.8 | 36.3 | 67.0 | 88.0 |

COBALT EXTRACTION

The behavior of cobalt is similar to that of nickel as just described in many respects. Like nickel, divalent cobalt is extracted from slightly acid solutions with some extractant reagents and is extracted from basic solutions by all the reagents in the group. Also, like nickel, extractions of cobalt from ammoniacal solutions at first increase as ammonia concentration is increased from zero. However, cobalt extraction does not fall off as rapidly as does nickel extraction $NH_3$ concentration is increased beyond the optimum level. In a similar way, cobalt extraction is less adversely affected than nickel extraction by increasing ammonium sulphate concentration. Substantially complete cobalt extraction is easily obtained with ammonium sulphate concentrations in the order of 100 g.p.l. or higher.

Cobalt is not stripped from loaded organic as readily as nickel is with concentrated ammoniacal ammonium sulphate solution. For cobalt stripping, optimum results are obtained with acid solution of somewhat higher strength than that used for nickel stripping. Rapid and complete cobalt stripping is effected with 50–300 g.p.l. sulphuric acid solution.

The following examples further illustrate the application of the process in the extraction of cobalt.

EXAMPLE 6

The extractant reagent was the same as in Example 1. The feed solution was ammoniacal cobalt ammonium sulphate solution containing 2 g.p.l. cobalt and 450 g.p.l. of ammonium sulphate. The effect of increasing ammonia concentration on extraction of cobalt is shown in Table VI.

TABLE VI

| $NH_3$ concentration (g.p.l.) | 1 | 2 | 3 | 5 | 10 | 20 | 30 |
|---|---|---|---|---|---|---|---|
| Cobalt extraction (percent) | 56 | 98 | 99.8 | 94 | 82 | 64 | 60 |

EXAMPLE 7

The extractant reagent was the same as in Example 1. The feed solution was an ammoniacal cobalt ammonium sulphate solution containing 4.5 g.p.l. of cobalt and 6.0 g.p.l. of ammonia. The effect of increasing ammonium sulphate concentration on cobalt extraction is shown in Table VII.

TABLE VII

| Ammonium sulfate concentration (g.p.l.) | 50 | 100 | 200 | 300 | 400 |
|---|---|---|---|---|---|
| Cobalt extraction (percent) | 100 | 98 | 94 | 90 | 84 |

EXAMPLE 8

This example illustrates the rate of stripping of cobalt from the loaded organic. The extractant reagent was the same as in Example 1, the organic contained 4.6 grams per litre of cobalt and the volume ratio of stripping solution to loaded organic was 1:1. Table VIII shows the rate of stripping with sulphuric acid solution containing 50 g.p.l. and 300 g.p.l.

TABLE VIII

| Contact time (minutes) | 1 | 3 | 5 | 10 | 15 |
|---|---|---|---|---|---|
| Cobalt stripped (percent): | | | | | |
| 50 g.p.l. $H_2SO_4$ | | 8 | 35 | 42 | 74 | 98 |
| 300 g.p.l. $H_2SO_4$ | 38 | 96 | 100 | 100 | 100 |

EXAMPLE 9

In this example, the aqueous feed contained 2 g.p.l. of cobalt, 9.8 g.p.l. ammonia and 450 g.p.l. ammonium sulphate. The extractant was the same as in Example 5. Extractions were carried out on a number of fresh samples of solution with varying amounts of nonylphenol modifier being used. The effect of nonylphenol concentration on the extraction of cobalt is shown in the following Table IX.

TABLE IX

| Nonylphenol in organic phase (percent) | 0 | 5 | 10 | 15 | 20 |
|---|---|---|---|---|---|
| Cobalt extracted (percent) | 30 | 59 | 76 | 84 | 87 |

EXAMPLE 10

In this example, the extractant compound was 2,2'-thiobis (4 - methyl-6-tertiary butylphenol), commercially available from Ashland Chemical Company as CAO-6. The aqueous feed was a solution containing 1.74 g.p.l. cobalt as cobalt sulfate, 5 g.p.l. $(NH_4)_2SO_4$ and 30 g.p.l. $N_3$. After contacting equal volumes of these aqueous and organic phases for about 30 seconds, the organic turned dark red-brown and the raffinate was found to contain only 0.27 g.p.l. cobalt. Thus, about 85% of the cobalt was extracted from the feed solution.

A portion of the pregnant organic phase was contacted with an equal volume of 30% $H_2SO_4$ for 15 minutes on a mechanical shaker. After this treatment the organic phase was again light in color and the cobalt was found in the stripping solution.

EXTRACTION OF COPPER, ZINC AND OTHER DIVALENT METAL IONS

The extraction behavior of copper and zinc is similar to that of nickel and cobalt with the exception that copper is extracted from solutions at pH values as low as 4.5, although for optimum extractions the pH preferably is above 6. Preferably zinc and copper stripping is effected with 100–200 g.p.l. $H_2SO_4$ solution.

The following examples illustrate the application of the process in the extraction of copper.

EXAMPLE 11

In this example, the extractant reagent was the same as in Example 1 and the feed solution was an ammoniacal copper ammonium sulphate solution containing 5 g.p.l. copper. The effect of increasing ammonia concentration on copper extraction at various levels of ammonium sulphate concentration is shown in Table XI.

TABLE XI

| | Cobalt extractions percent | | |
|---|---|---|---|
| | (1) With no $(NH_4)_2SO_4$ | (2) with 100 g.p.l. $(NH_4)_2SO_4$ | (3) With 450 g.p.l. $(NH_4)_2SO_4$ |
| $NH_3$/Cu molar ratio: | | | |
| 1 | 85 | 60 | 45 |
| 2 | 94 | 82 | 73 |
| 3 | 97 | 90 | 60 |
| 5 | 99 | 83 | 54 |
| 8 | 99 | 68 | 45 |
| 10 | | 64 | 23 |
| 20 | | 55 | 15 |

EXAMPLE 12

In this example, the feed solution was an ammoniacal copper ammonium carbonate solution containing 61.8 g.p.l. copper and 84.3 g.p.l. ammonia (combined as ammonium carbonate). The organic solvent was the same as in Example 1 except taht 10% nonylphenol was used in the modifier in place of isodecanol and the volume ratio organic to aqueous feed was 2. The organic was contacted with feed, separated and then stripped with 150 g.p.l. $H_2SO_4$ solution used in 1:1 volume ratio with the loaded organic. The regenerated (stripped) organic was repeatedly contacted with the raffinate from the preceding extraction step until the copper was completely extracted. The results are shown in Table XII.

TABLE XII

| Number of contacts of regenerated organic with raffinate | Concentration of copper in feed solution (g.p.l.) |
|---|---|
| 0 | 61.8 |
| 1 | 47.5 |
| 2 | 31.5 |
| 3 | 17.5 |
| 4 | 6.0 |
| 5 | 0.1 |

EXAMPLE 13

In this example, the same extractant was used as in Example 5. The solution was a dilute copper sulphate solution containing 1 g.p.l. of copper. Table XIII shows the extraction of copper at various pH values.

TABLE XIII

| pH | 3 | 4 | 4.5 | 5 | 5.6 | 6 |
|---|---|---|---|---|---|---|
| Copper extraction (percent) | 0 | 20 | 47 | 78 | 95 | 99 |

Extraction of zinc is illustrated in the following examples.

EXAMPLE 14

In this example, the extractant was the same as in Example 1; the feed solution was an ammoniacal zinc ammonium sulphate solution containing 5 g.p.l. of zinc. The effect of increasing ammonia concentration on zinc extraction at various levels of ammonium sulphate concentration is shown in Table XIV.

TABLE XIV

| | Zinc extractions (percent) | | |
|---|---|---|---|
| | (1) With no $(NH_4)_2SO_4$ | (2) With 100 g.p.l. $(NH_4)_2SO_4$ | (3) With 450 g.p.l. $(NH_4)_2SO_4$ |
| $NH_3$/Zn molar ratio: | | | |
| 1 | 98 | 78 | 10 |
| 2 | 99 | 83 | 34 |
| 3 | 99 | 76 | 60 |
| 5 | 98 | 67 | 42 |
| 10 | 98 | 50 | 27 |
| 15 | 97 | 44 | 21 |

EXAMPLE 15

In this example, the extractant was the same as in Example 1, and the aqueous solution was a sulphate solution containing 1 g.p.l. zinc. Effect of pH of the aqueous phase on extraction of zinc is shown in Table XV.

TABLE XV

| pH | 5 | 5.5 | 6 | 7 | 8 |
|---|---|---|---|---|---|
| Zinc extraction (percent) | 3 | 20 | 35 | 97 | 98 |

EXAMPLE 16

This invention illustrates the extraction of iron from an aqueous solution. The extractant was the same as in Example 1 and the aqueous feed contained 1 g.p.l. ferrous iron as the sulphate. The effect of pH of the aqueous phase on the extraction of iron is shown in Table XVI.

TABLE XVI

| pH | 3.0 | 3.9 | 4.1 | 4.4 | 4.7 |
|---|---|---|---|---|---|
| Iron extraction (percent) | 0 | 12 | 38 | 83 | 100 |

At the higher pH values it is difficult to avoid the oxidation of ferrous iron to ferric iron and the precipitation of ferric hydroxide.

EXAMPLE 17

This example illustrates the extraction of calcium from an aqueous solution. The extractant was the same as in Example 1 and the aqueous feed was a cloudy, saturated solution of calcium hydroxide. Contact of these two phases generated a bright yellow color in the organic phase and brought about clearing of the aqueous phase. Disengagement was very rapid. The organic phase was separated from the raffinate, and contacted with 50 g.p.l. $H_2SO_4$. The organic phase returned to its initial very light tan color and insoluble calcium sulfate precipitated in the stripping aqueous phase.

The embodiments of the invention in which an exclusive property or privilege is claimed are defined as follows:

1. A process for recovering from aqueous solutions dissolved values of metals which are present in said solutions as divalent cations and being selected from the group consisting of cobalt, nickel, copper, cadmium, zinc, ferrous iron calcium, and mixtures thereof which comprises:
    (a) contacting the aqueous solution with liquid organic phase comprising a nonreactive and substantially water-immiscible organic diluent and a bisphenol sulphide compound to extract at least a portion of said metal values into the organic phase, and said aqueous solution having a pH level sufficient for extraction of the metal values into the organic phase, and said bisphenol sulphide compound being selected from the group of 2,2'-thiobis (α-naphthol), 1,1'-thiobis (β-naphthol), and bisphenol sulphide compounds having the formula:

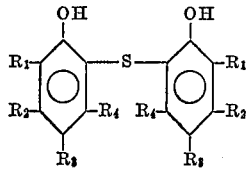

wherein each $R_1$, $R_2$, $R_3$, and $R_4$ are individually hydrogen, alkyl, aryl, arylalkyl, nitro, and halogen in such combinations that the compound is soluble in the organic diluent but substantially insoluble in water, and the temperature and pressure of the extraction of the metal values into the organic phase being such to maintain the aqueous and organic phases in the liquid phase;

(b) separating the resulting metal value containing organic phase from the aqueous phase, and
    (c) recovering the metal value containing organic phase.

2. The process according to claim 1 wherein the said aqueous solution is an aqueous ammoniacal solution.

3. The process according to claim 2 wherein said dissolved values are those of at least one metal selected from the group consisting of nickel, cobalt, copper, cadmium and zinc.

4. The process according to claim 3 wherein the bisphenol sulphide compound is selected from the group consisting of 2,2'-thiobis (4-methyl-6-tertiary butyl phenol); 2,2'-thiobis (4-nonylphenol); 2,2'-thiobis (4-nonyl-6-methylphenol); 2,2'-thiobis (4-nonyl-6-ethylphenol); 2,2'-thiobis (4-nonyl-6-isopropylphenol); 2,2'-thiobis (4-nonyl-6-tertiary butylphenol); 2,2'-thiobis (4-octylphenol); 2,2'-thiobis (4-dodecylphenol); 2,2'-thiobis (4-tridecylphenol); 2,2'-thiobis (4-laurylphenol); 2,2'-thiobis [4-(1-methylbenzyl) phenol], 2,2'-thiobis [4,6-di (tertiary butyl) phenol]; 2,2'-thiobis (α-naphthol); 1,1'-thiobis (β-naphthol).

5. The process according to claim 4 wherein the organic diluent phase contains about 5 to about 25% of the bisphenol sulphide compound.

6. The process according to claim 5 wherein the dissolved metal is nickel and the bisphenol sulphide compound is 2,2'-thiobis (4-nonylphenol).

7. The process according to claim 5 wherein the dissolved metal value is divalent cobalt and the bisphenol sulphide compound is 2,2'-thiobis (4-nonyl-6-methylphenol).

8. The process according to claim 5 wherein the dissolved metal value is divalent copper and the bisphenol sulphide compound is 2,2'-thiobis (4-nonyl-6-methylphenol).

9. The process according to claim 5 wherein the dissolved metal value is divalent cobalt and the bisphenol sulphide compound is 2,2'-thiobis (4-methyl-6-tertiary butylphenol).

10. The process of claim 1 which further includes the step of removing the metal values from the metal containing organic phase by contacting said phase with an aqueous acid solution or aqueous concentrated ammoniacal ammonium sulphate solution to strip metal values from the organic phase and then separating the organic phase from the metal containing aqueous acid solution or metal containing concentrated ammoniacal ammonium sulphate solution.

References Cited
UNITED STATES PATENTS

| 2,331,448 | 10/1943 | Winning et al. | 260—609 |
| 2,398,253 | 4/1946 | Rogers et al. | 219—69 |
| 3,006,886 | 10/1961 | Schilling | 260—45.75 |
| 3,336,133 | 8/1967 | Funatsu et al. | 75—97 R |
| 3,369,876 | 2/1968 | Grimm | 423—24 |

OTHER REFERENCES

Chemical Abstracts 55:18089a.

OSCAR R. VERTIZ, Primary Examiner

H. S. MILLER, Assistant Examiner

U.S. Cl. X.R.

75—97 R; 423—99, 139, 157